United States Patent
Kobori et al.

(10) Patent No.: US 12,519,909 B2
(45) Date of Patent: Jan. 6, 2026

(54) MOVING BODY SYSTEM

(71) Applicant: TOYOTA JIDOSHA KABUSHIKI KAISHA, Aichi-ken (JP)

(72) Inventors: Norimasa Kobori, Tokyo-to (JP); Takashi Homma, Tokyo-to (JP); Yumi Sato, Tokyo-to (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 55 days.

(21) Appl. No.: 18/632,287

(22) Filed: Apr. 11, 2024

(65) Prior Publication Data

US 2024/0397020 A1 Nov. 28, 2024

(30) Foreign Application Priority Data

May 22, 2023 (JP) .................. 2023-084197

(51) Int. Cl.
| | |
|---|---|
| *G06V 20/00* | (2022.01) |
| *G06T 7/00* | (2017.01) |
| *G06T 7/70* | (2017.01) |
| *G06V 20/56* | (2022.01) |
| *H04N 7/18* | (2006.01) |

(52) U.S. Cl.
CPC ............. *H04N 7/185* (2013.01); *G06T 7/70* (2017.01); *G06V 20/56* (2022.01); *G06T 2207/30252* (2013.01)

(58) Field of Classification Search
CPC . H04N 7/185; G06T 7/70; G06T 2207/30252; G06V 20/56
USPC .............................................. 701/1
See application file for complete search history.

(56) References Cited

FOREIGN PATENT DOCUMENTS

| | | | |
|---|---|---|---|
| JP | 2006-146432 A | | 6/2006 |
| JP | 3951786 B2 | * | 8/2007 |
| JP | 2018-190199 A | | 11/2018 |
| JP | 2020046726 A | | 3/2020 |
| JP | 2020-123075 A | | 8/2020 |
| JP | 2022093704 A | | 6/2022 |
| JP | 2023139612 A | * | 10/2023 |

OTHER PUBLICATIONS

English Translation of JP-2023139612 (Year: 2023).*

* cited by examiner

*Primary Examiner* — Tiffany P Young
(74) *Attorney, Agent, or Firm* — HAUPTMAN HAM, LLP

(57) ABSTRACT

A moving body system is mounted on a moving body. The moving body system includes processing circuitry and one or more memory devices configured to store upload specification information indicating at least an upload target area specified in advance. The moving body system acquires information on a current position of the moving body and an image captured by a camera mounted on the moving body. The moving body system communicates with a management system which is external to the moving body and which uses the image. The moving body system compares the current position of the moving body with the upload target area. The moving body system prohibits uploading the image to the management system when the current position of the moving body is outside of the upload target area.

5 Claims, 4 Drawing Sheets

MOVING BODY SYSTEM

CROSS-REFERENCE TO RELATED APPLICATION

This application claims priority to Japanese Patent Application No. 2023-084197 filed on May 22, 2023, the entire contents of which are incorporated by reference herein.

TECHNICAL FIELD

The present disclosure relates to a technique for uploading an image captured by a camera mounted on a moving body.

BACKGROUND ART

Patent Literature 1 discloses a distribution system including an in-vehicle device and a management server. The in-vehicle device transmits a captured camera image to the management server at a predetermined period. The management server selects a vehicle near head of congestion as a candidate vehicle and notifies a network address of the candidate vehicle to a following receiving vehicle. The receiving vehicle communicates with the candidate vehicle as a distribution source vehicle and receives the camera image from the distribution source vehicle.

LIST OF RELATED ART

Patent Literature 1: Japanese Laid-Open Patent Application No. 2020-123075

SUMMARY

Using an image captured by a camera mounted on a moving body will be considered. The image is uploaded to a management system and used for monitoring, for example. However, if all the images captured by the camera mounted on the moving body are uploaded to the management system, a communication cost increases.

An object of the present disclosure is to provide a technique capable of reducing a communication cost when an image captured by a camera mounted on a moving body is used.

One aspect of the present disclosure relates to a moving body system mounted on a moving body.

The moving body system includes processing circuitry, and one or more memory devices configured to store upload specification information indicating at least an upload target area specified in advance.

The processing circuitry acquires information on a current position of the moving body and an image captured by a camera mounted on the moving body.

The processing circuitry communicates with a management system which is external to the moving body and which uses the image.

The processing circuitry compares the current position of the moving body with the upload target area.

The processing circuitry prohibits uploading the image to the management system when the current position of the moving body is outside of the upload target area.

According to the present disclosure, when the moving body is located outside of the upload target area, uploading the image to the management system is prohibited. Since the image is not always uploaded and unnecessary image uploading is not performed, an amount of data transmission is reduced and thus the communication cost is reduced.

DETAILED DESCRIPTION

1. Overview

A moving body will be considered. Examples of the moving body include a vehicle, a robot, and a flying body. The vehicle may be an autonomous driving vehicle or a vehicle driven by a driver. Examples of the robot include a distribution robot. Examples of the flying body include an airplane and a drone. As an example, in the following description, a case where the moving body is a vehicle will be considered. For generalization, "vehicle" and "in-vehicle system" in the following description are replaced with "moving body" and "moving body system", respectively.

Figure 1:
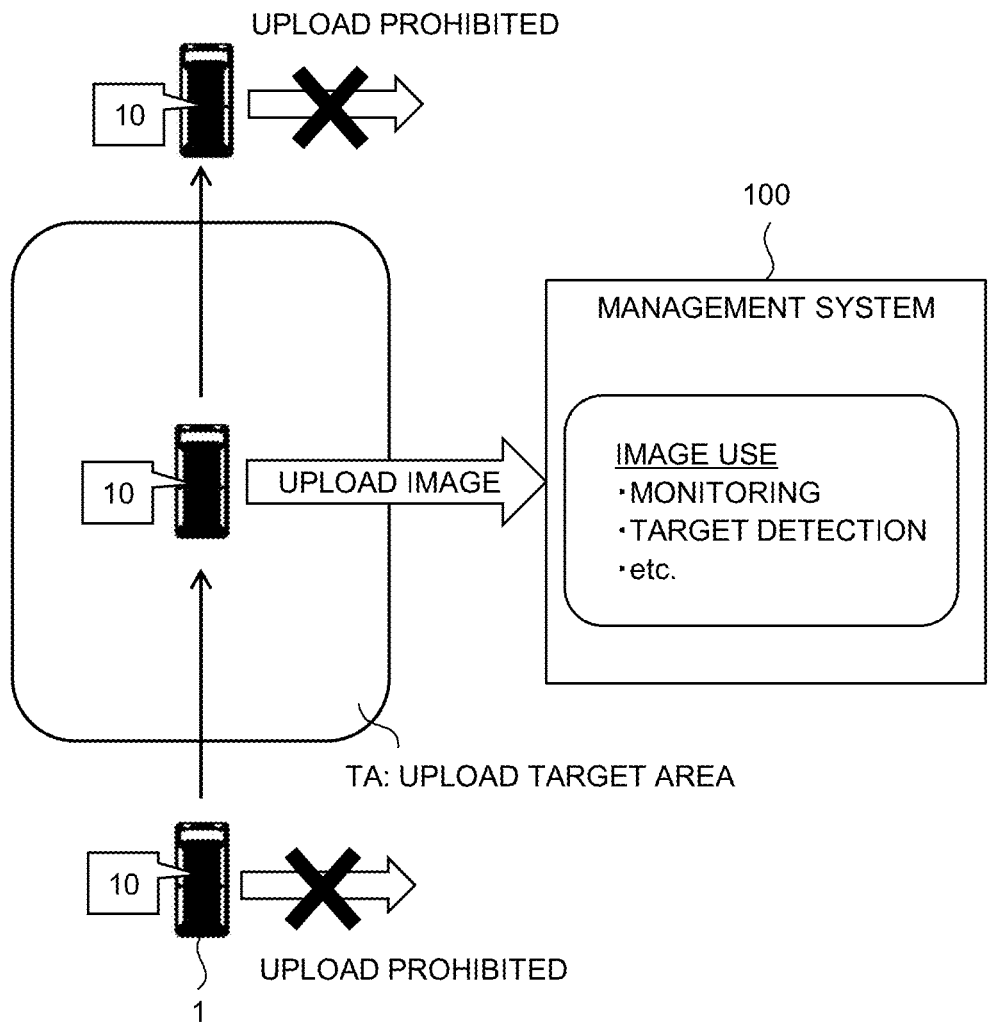
FIG. 1 is a conceptual diagram for explaining an overview of an in-vehicle system mounted on a vehicle according to an embodiment.

FIG. 1 is a conceptual diagram for explaining an overview of an in-vehicle system 10 mounted on a vehicle 1 according to the present embodiment. The in-vehicle system 10 has a function of acquiring a current position of the vehicle 1. The in-vehicle system 10 acquires an image captured by a camera mounted on the vehicle 1. The in-vehicle system 10 may control the vehicle 1 based on the image. For example, the in-vehicle system 10 may control autonomous driving of the vehicle 1 based on the image.

The image captured by the camera mounted on the vehicle 1 may be used for purposes other than the control of the vehicle 1. For example, the image may be used for monitoring in a town. The monitoring includes detection of an abnormality (e.g., accident, trouble, crime, suspicious person, sick person, etc.). As another example, the image may be used for detection of a target (e.g., a person or an event) present in a town. In any case, the abnormality or the target can be detected from the image by using a machine learning model.

The image acquired in the vehicle 1 is used by a management system 100 outside of the vehicle 1. Therefore, the in-vehicle system 10 communicates with the management system 100 and uploads (transmits) the acquired image to the management system 100 as necessary. However, if all the images acquired in the vehicle 1 are unconditionally uploaded to the management system 100, communication cost increases.

Therefore, in the present embodiment, the management system 100 specifies in advance an area where the image is desired. The area specified in advance by the management system 100 is hereinafter referred to as an "upload target area TA". The upload target area TA can also be said to be an area subjected to monitoring or target detection by the management system 100. The management system 100 distributes information indicating at least the upload target area TA to the one or more vehicles 1. Before each of the vehicle 1 enters the upload target area TA, the in-vehicle system 10 mounted on each of the vehicle 1 receives information distributed from the management system 100 in advance.

During operation of the vehicle 1, the in-vehicle system 10 acquires the current position of the vehicle 1 and compares the current position of the vehicle 1 with the upload target area TA in real time. When the current position of the vehicle 1 is outside of the upload target area TA, the in-vehicle system 10 prohibits uploading the image to the management system 100. In this case, the image is not uploaded from the in-vehicle system 10 to the management system 100.

On the other hand, when the current position of the vehicle 1 is within the upload target area TA, the in-vehicle system 10 permits uploading of the image to the management system 100. In this case, the in-vehicle system 10 uploads the image to the management system 100 in real time. The in-vehicle system 10 may upload information on the current position of the vehicle 1 to the management system 100 together with the image. The image uploaded to the management system 100 can be used by the management system 100.

As described above, according to the present embodiment, when the vehicle 1 is located outside of the upload target area TA, uploading of the image to the management system 100 is prohibited. Since the image is not always uploaded and unnecessary image uploading is not performed, the amount of data transmission is reduced and the communication cost is reduced.

According to the present embodiment, when the vehicle 1 is located within the upload target area TA, the image captured in the upload target area TA is uploaded to the management system 100 in real time. The management system 100 can monitor the upload target area TA in real time and detect a target in the upload target area TA in real time based on the image uploaded from the vehicle 1.

As another example, the management system 100 may further specify a period of time in which the image is desired in advance. The period of time specified in advance by the management system 100 is hereinafter referred to as an "upload target period of time TH". The upload target period of time TH can also be said to be a period of time in which the management system 100 operates monitoring or target detection. The management system 100 distributes information indicating the upload target area TA and the upload target period of time TH to the one or more vehicles 1. During the operation of the vehicle 1, the in-vehicle system 10 compares a current time with the upload target period of time TH. When the current time is outside of the upload target period of time TH, the in-vehicle system 10 prohibits uploading the image to the management system 100. In this case, the image is not uploaded from the in-vehicle system 10 to the management system 100. Only when the current position of the vehicle 1 is within the upload target area TA and the current time is within the upload target period of time TH, the in-vehicle system 10 uploads the image to the management system 100 in real time. The in-vehicle system 10 may upload the information on the current position of the vehicle 1 to the management system 100 together with the image. According to this example, the amount of data transmission is further reduced, and the communication cost is further reduced.

The in-vehicle system 10 according to the present embodiment will be described in more detail below.

2. Configuration Example of In-Vehicle System

Figure 2:
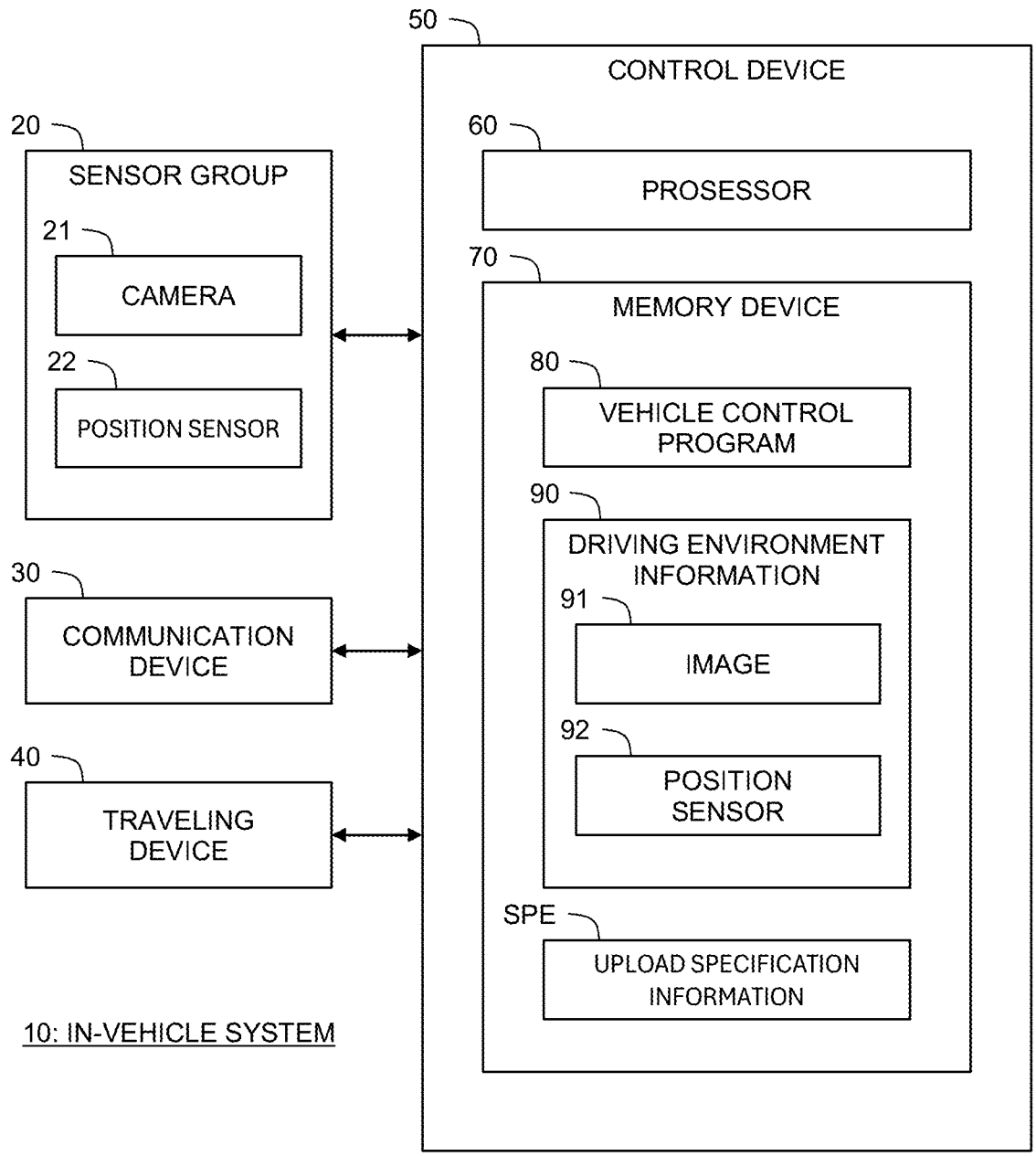
FIG. 2 is a block diagram showing a configuration example of the in-vehicle system according to the embodiment.

FIG. 2 is a block diagram showing a configuration example of the in-vehicle system 10 according to the present embodiment. The in-vehicle system 10 includes a sensor group 20, a communication device 30, a traveling device 40, and a control device 50.

The sensor group 20 includes a camera 21, a position sensor 22, etc. The camera 21 recognizes situation around the vehicle 1. The position sensor 22 detects position and orientation of the vehicle 1. For example, the position sensor 22 includes a global navigation satellite system (GNSS). The sensor group 20 may include a recognition sensor (for example, LIDAR) other than the camera 21. The sensor group 20 may include a vehicle state sensor such as a speed sensor, an accelerometer, a yaw rate sensor, and a steering angle sensor.

The communication device 30 communicates with the outside via a communication network. For example, the communication device 30 communicates with the management system 100. Examples of a communication method include mobile communication such as 5G and wireless LANs.

The travel device 40 includes a steering device, a driving device, and a braking device. The steering device steers the wheels. For example, the steering device includes an electric power steering (EPS) device. The driving device is a power source generating driving force. Examples of the driving device include an engine, an electric motor, and an in-wheel motor. The braking device generates braking force.

The control device 50 is a computer controlling the vehicle 1. The control device 50 includes one or more processors 60 (hereinafter, simply referred to as a processor 60) and one or more memory device 70 (hereinafter, simply referred to as a memory device 70). The processor 60 executes various processes. For example, the processor 60 includes a central processing unit (CPU). The processor 60 can be referred as processing circuitry. The memory device 70 stores various kinds of information. Examples of the memory device 70 include a volatile memory, a non-volatile memory, a hard disk drive (HDD), and a solid-state drive (SSD).

A vehicle control program 80 is a computer program for controlling the vehicle 1. The functions of the control device 50 are realized by the cooperation of the processor 60 that executes the vehicle control program 80 and the memory device 70. The vehicle control program 80 is stored in the memory device 70. Alternatively, the vehicle control program 80 can be recorded in a non-transitory computer-readable recording medium.

The control device 50 acquires driving environment information 90 indicating driving environment of the vehicle 1. The driving environment information 90 is stored in the memory device 70.

The driving environment information 90 includes an image 91 captured by the camera 21. The driving environment information 90 may include object information regarding an object recognized by the recognition sensor. Examples of the object around the vehicle 1 include a pedestrian, another vehicle, a white line, a landmark, and a traffic light, etc. The object information indicates relative position and relative velocity of the object with respect to the vehicle 1.

The driving environment information 90 further includes position information 92 indicating the current position of the vehicle 1. The control device 50 acquires the position information 92 from the result of the detection by the position sensor 22. The control device 50 may acquire the highly accurate position information 92 by well-known localization process using the object information and map information.

The driving environment information 90 further includes vehicle state information detected by the vehicle state sensor.

The control device 50 also executes vehicle travel control for controlling the travel of the vehicle 1. The vehicle travel control includes steering control, acceleration control, and deceleration control. The control device 50 executes the vehicle travel control by controlling the travel device 40 (steering device, driving device, braking device).

Further, the control device 50 performs autonomous driving control for controlling autonomous driving of the vehicle 1. Here, the autonomous driving means that at least a part of steering, acceleration, and deceleration of the vehicle 1 is automatically performed independently of operation by a driver. As an example, autonomous driving at level 3 or higher can be performed. The control device 50 generates a travel plan of the vehicle 1 based on the driving environment information 90. Examples of the travel plan include maintaining the current travel lane, lane changes, turning right or left, and avoiding collision with an object, etc. Further, the control device 50 generates a target trajectory for realizing the travel plan. The target trajectory includes target position and target velocity of the vehicle 1. Then, the control device 50 performs the vehicle travel control so that the vehicle 1 follows the target trajectory.

Further, the control device 50 communicates with the management system 100 via the communication device 30 and receives the upload specification information SPE distributed from the management system 100. The upload specification information SPE indicates at least the upload target area TA specified in advance by the management system 100. The upload specification information SPE may indicate the upload target area TA and the upload target period of time TH specified in advance by the management system 100. Typically, before the vehicle 1 enters the upload target area TA, the control device 50 receives the upload specification information SPE distributed from the management system 100 in advance. The control device 50 stores the received upload specification information SPE in the memory device 70.

The control device 50 executes "image upload process" for uploading the image 91 to the management system 100 based on the upload specification information SPE. Some examples of the image upload process according to the present embodiment will be described below.

3. Image Upload Process

3-1. First Example

Figure 3:
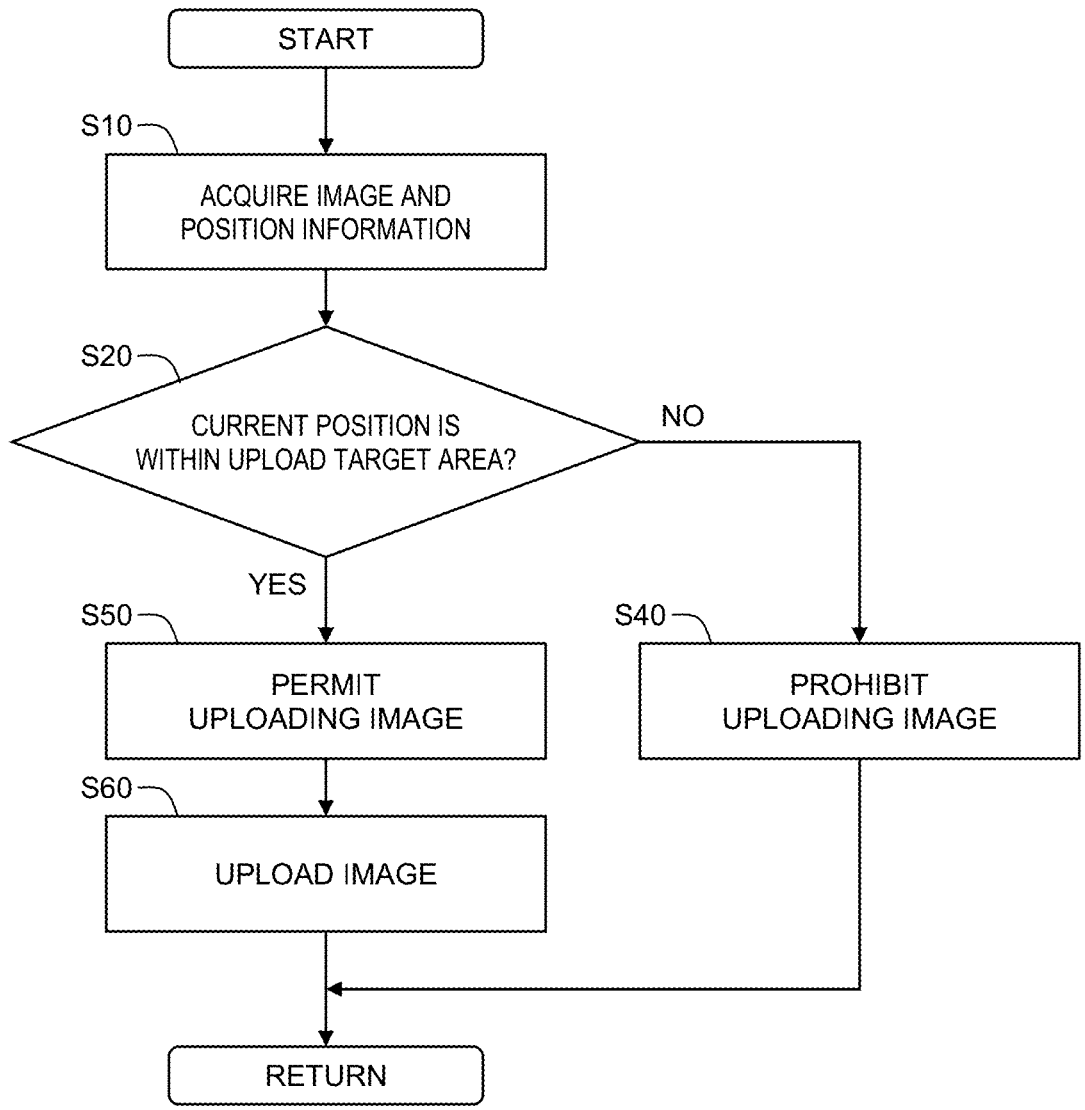
FIG. 3 is a flowchart showing a first example of an image uploading process according to the embodiment.

FIG. 3 is a flowchart showing a first example of the image uploading process. In step S10, the control device 50 acquires the image 91 and the position information 92. In the following step S20, the control device 50 compares the current position of the vehicle 1 indicated by the position information 92 with the upload target area TA indicated by the upload specification information SPE.

When the current position of the vehicle 1 is outside of the upload target area TA (step S20; No), the process proceeds to step S40. In step S40, the control device 50 prohibits uploading the image 91 to the management system 100. In this case, the image 91 is not transmitted to the management system 100. Thereafter, the process returns to step S10.

On the other hand, when the current position of the vehicle 1 is within the upload target area TA (step S20; Yes), the processing proceeds to step S50. In step S50, the control device 50 permits uploading the image 91 to the management system 100. Then, in step S60, the control device 50 uploads the image 91 to the management system 100. The control device 50 can upload the position information 92 to the management system 100 together with the image 91. Thereafter, the process returns to step S10.

3-2. Second Example

Figure 4:
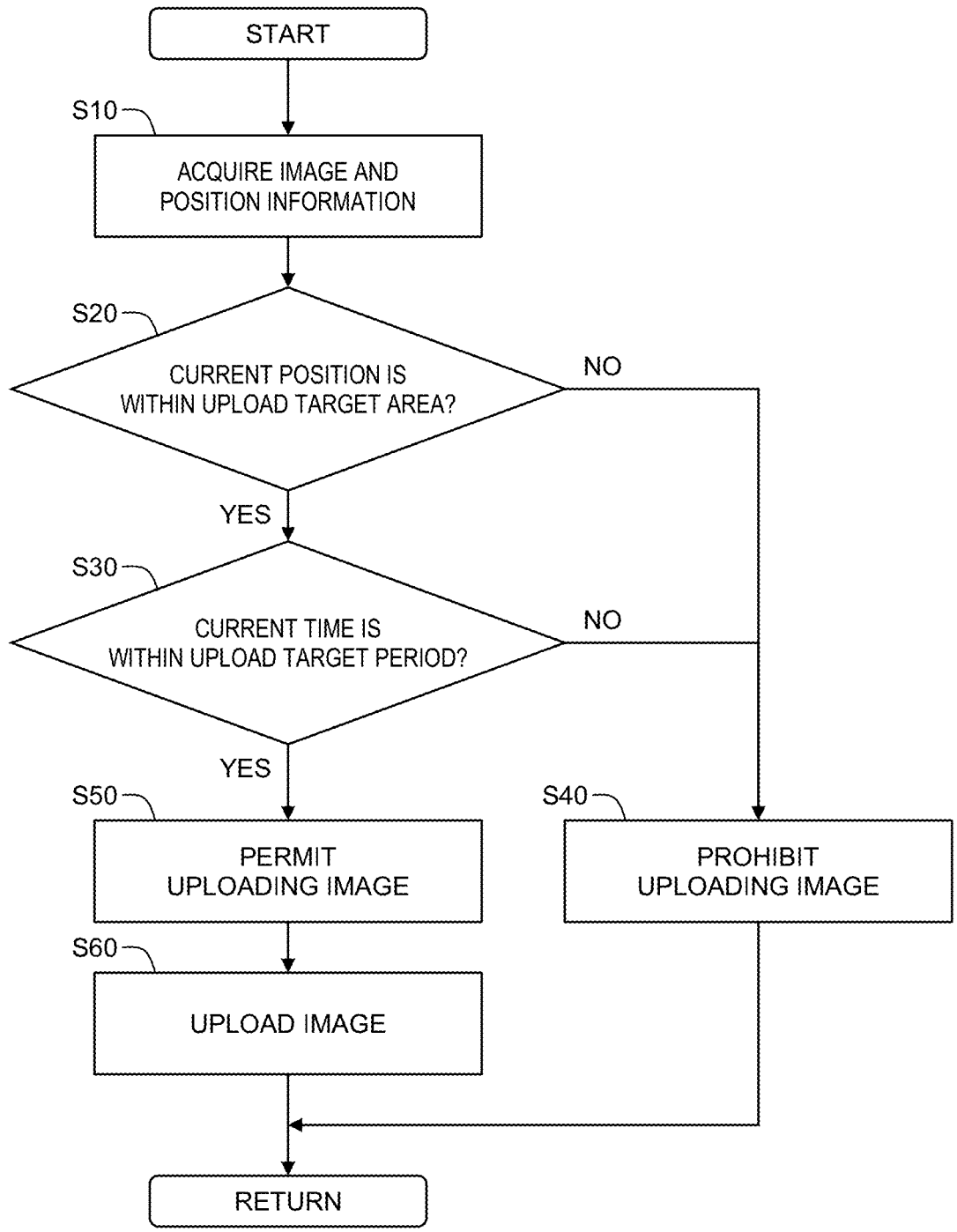
FIG. 4 is a flowchart showing a second example of the image uploading process according to the embodiment.

FIG. 4 is a flowchart showing a second example of the image uploading process. Compared to the first example, step S30 is added. When the current position of the vehicle 1 is within the upload target area TA (step S20; Yes), the process proceeds to step S30.

In step S30, the control device 50 acquires information of the current time and compares the current time with the upload target period of time TH indicated by the upload specification information SPE. When the current time is outside of the upload target period of time TH (step S30; No), the process proceeds to step S40. On the other hand, when the current time is within the upload target period of time TH (step S30; Yes), the process proceeds to step S50. The other configurations are the same as those of the first example.

What is claimed is:

1. A moving body system mounted on a moving body, comprising:
   processing circuitry; and
   one or more memory devices configured to store upload specification information indicating at least an upload target area specified in advance, wherein
   the processing circuitry is configured to:
      acquire information on a current position of the moving body and an image captured by a camera mounted on the moving body;
      communicate with a management system which is external to the moving body and which uses the image;
      compare the current position of the moving body with the upload target area; and
      prohibit uploading the image to the management system when the current position of the moving body is outside of the upload target area.

2. The moving body system according to claim 1, wherein the processing circuitry is further configured to upload the image to the management system in real time when the current position of the moving body is within the upload target area.

3. The moving body system according to claim 1, wherein the upload specification information further indicates an upload target period of time specified in advance, and the processing circuitry is further configured to:
   compare a current time with the upload target period of time;
   prohibit uploading the image to the management system when the current time is outside of the upload target period of time; and
   upload the image to the management system in real time, when the current position of the moving body is within the upload target area and the current time is within the upload target period of time.

4. The moving body system according to claim 1, wherein the upload specification information is distributed by the management system, and
   before the moving body enters the upload target area, the processing circuitry receives in advance the upload specification information distributed by the management system, and stores the received upload specification information in the one or more memory devices.

5. The moving body system according to claim 1, wherein the upload target area is subject to monitoring or target detection by the management system; and in the management system, the upload target area is monitored or a target in the upload target area is detected, based on the image uploaded from the moving body.

\* \* \* \* \*